Patented July 11, 1950

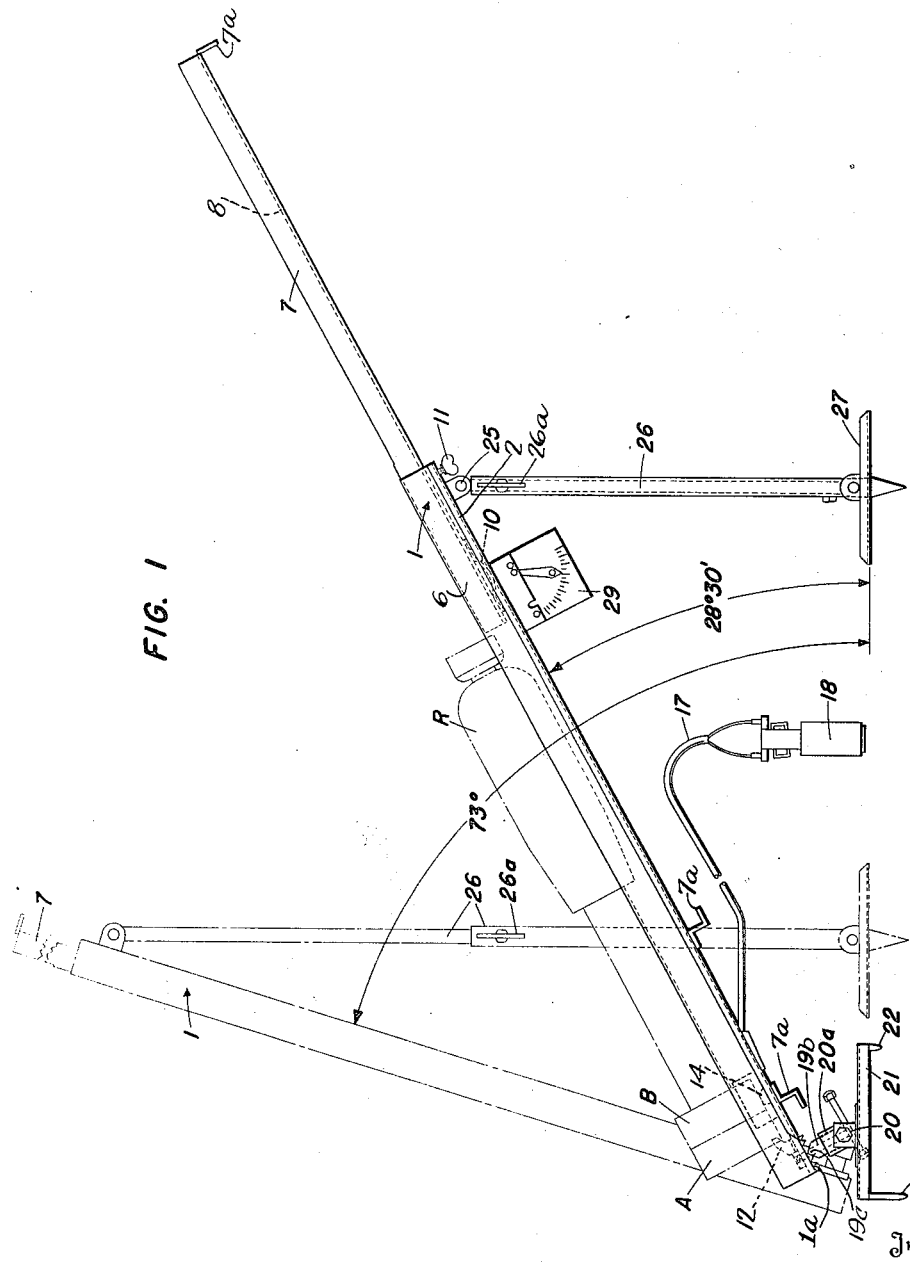

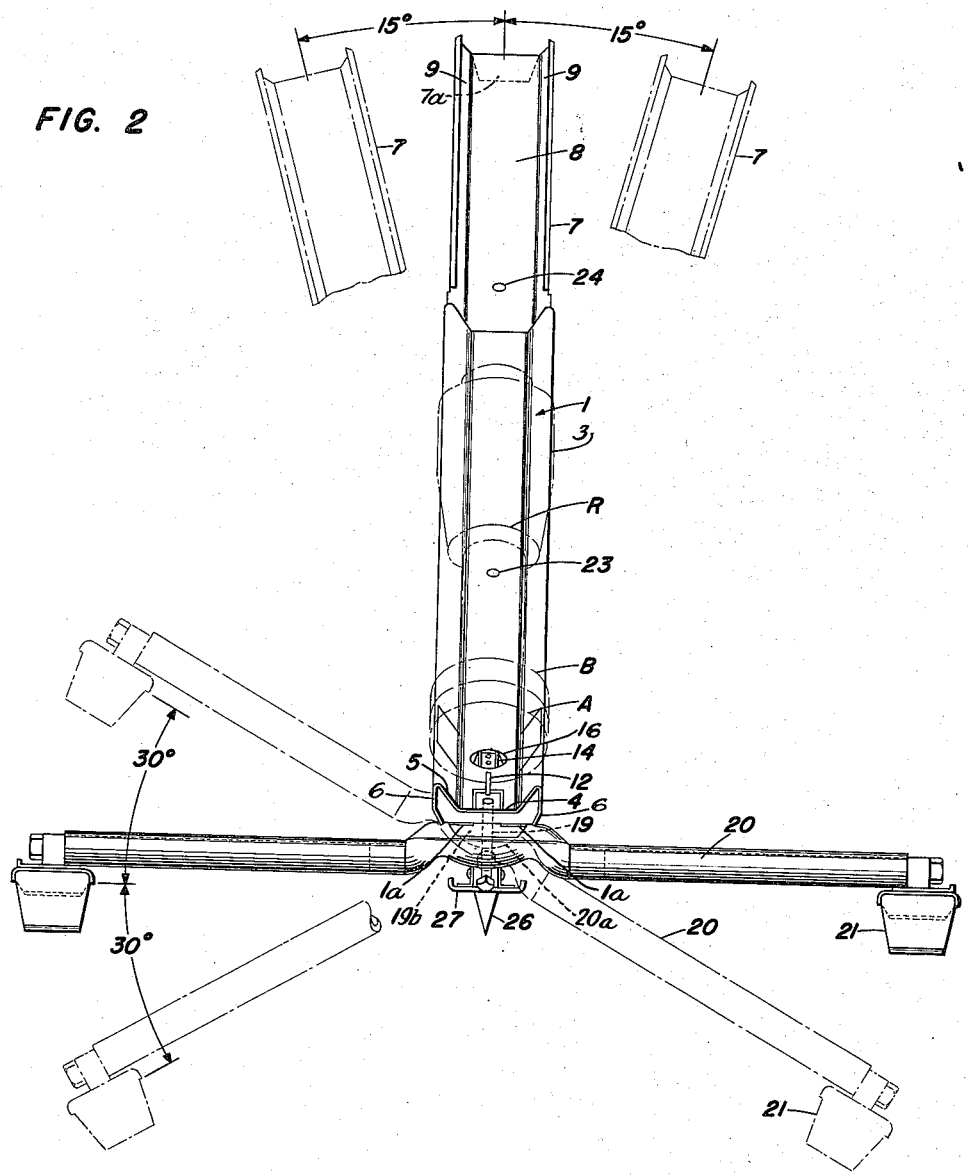

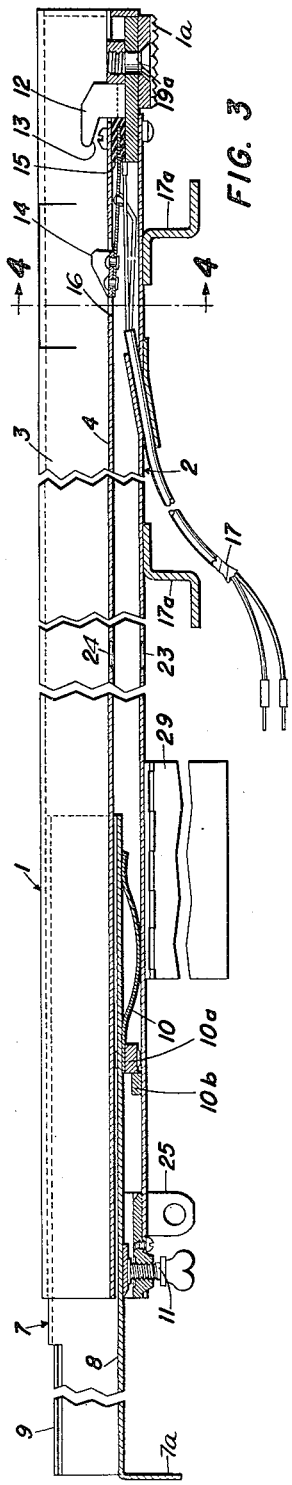
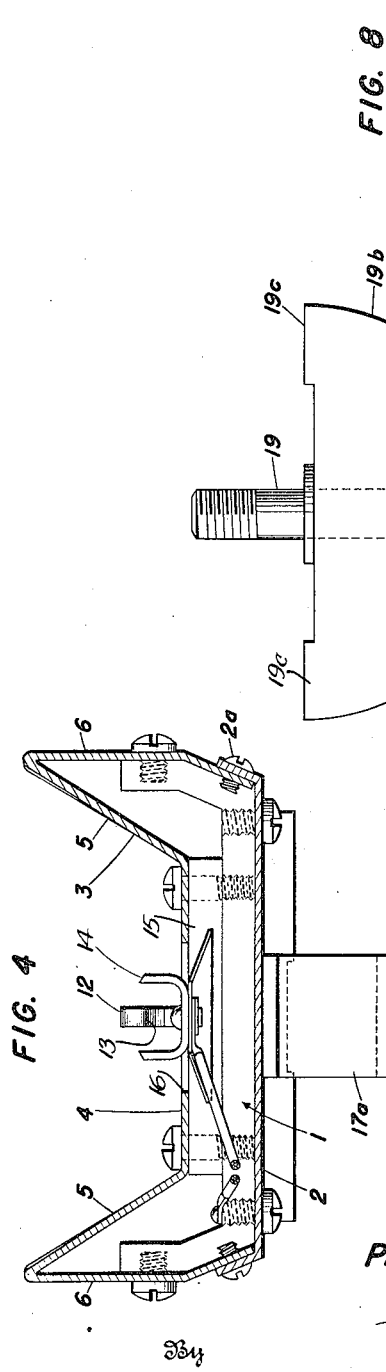
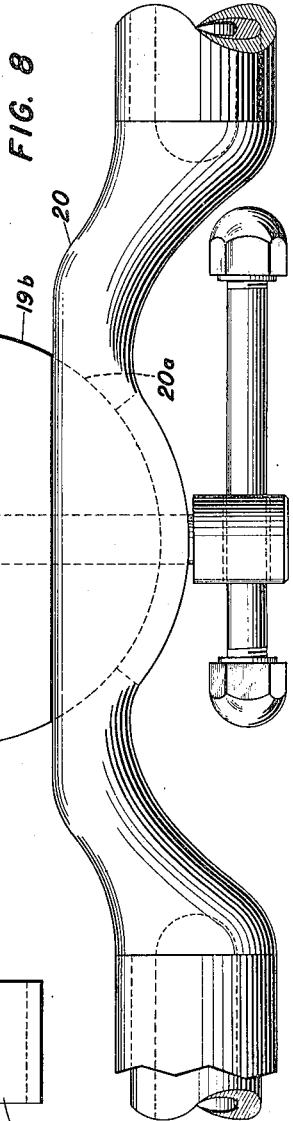

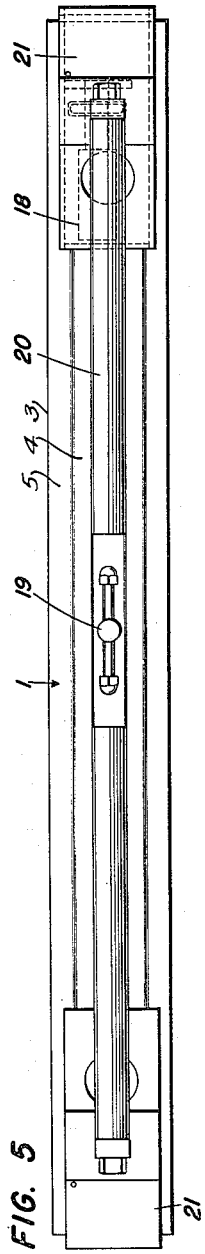

2,515,051

UNITED STATES PATENT OFFICE 2,515,051

ROCKET LAUNCHER

Paul E. Lloyd, Pasadena, Calif., assignor to the United States of America as represented by the Secretary of the Navy Application August 1, 1947, Serial No. 765,285

2 Claims. (Cl. 89—1.7)

This invention relates to launchers for rockets, and more particularly to an extensible rail portable rocket launcher.

An object of the invention is to provide a foldable rocket launcher which is adapted to be quickly set up for operation and is particularly suited for use on irregular terrain.

Another object of the invention is to provide a rocket launcher which is light in weight and capable of being folded into a compact bundle approximately the size of the rocket used with the launcher.

Another object of the invention is to provide a telescoping rocket launching rail for use with a foldable rocket launcher.

A further object of the invention is to provide a portable rocket launcher which is light in weight and simple to operate, and which is particularly adapted for use with electrically-fired rockets of the type described in the copending patent application of Charles C. Lauritsen, Serial No. 481,645, now Patent No. 2,469,350, filed April 2, 1943.

These and other objects of the invention will be apparent from the following specification and the accompanying drawings, in which Fig. 1 is a side elevational view of the launcher assembled for operation, showing the launcher at its extreme angle of elevation in broken lines;

Fig. 2 is the rear elevational view of the launcher assembled for operation, several adjustable positions thereof being indicated by broken lines;

Fig. 3 is a longitudinal sectional view of the launcher rail with the extended portion in operating position;

Fig. 4 is a cross sectional view taken on line 4—4 of Fig. 3;

Figs. 5, 6, and 7 are plan, side elevational, and bottom views respectively, of the launcher in disassembled or stowed condition; and Fig. 8 is a detailed elevational view of the central portion of the cross member which supports the rear end of the launcher rail.

In the preferred embodiment of the invention shown in the drawings, the launcher includes a launcher rail 1, which comprises a bottom channel member 2 and a top member 2 of sheet metal. The longitudinal edges of the top member 3 are bent upwardly to form diverging flanges 5, which define a channel 4, for guiding a rocket in its initial flight. The longitudinal side margins of the upturned edges of the top member are bent outwardly and downwardly upon themselves to form outer side walls 6, which are fastened to the edges of the bottom member 2 by means of screws 2a.

The hollow trough-shaped rail 1 thus formed is open at both ends, and at its forward end receives an extension member 7 of channel form comprising a bottom portion 8 and diverging upturned flanges 9. Near its rear end, the extension member 7 is provided with a leaf spring 10 and a stop member 10a. Spring 10 bears against the bottom member 2 to force the rail extension upwardly against the underside of the top member 3 of the rail. A set screw 11 extends into the forward end of the bottom member 2 to force the extension 7 tightly against the top plate 3 to restrain the extension from longitudinal movement with respect to the rail 1. The limit of outward movement of extension 7 is defined by contact of stop 10a with a cooperating stop 10b fastened to the upper side of the bottom member 2 near its forward end. The limit of inward movements of the extension is defined by contact of a flange 7a on the forward end of the extension with the forward end of rail 1. Threaded holes 23 in rail 1, of which one is shown in Fig. 3, and a threaded hole 24 in the extension 7 are aligned when the extension is in its stowed position for a purpose which will be explained presently.

The rear end of the launcher rail is provided with a ground contact 12 which projects upwardly through the top member 3 and has an undercut forward lip 13 for engagement with the grounded rear tail ring A of a 4½" rocket R indicated by broken lines in Figs. 1 and 2. The forward tail ring B of the rocket engages an insulated contact 14 supported within the space between the bottom and top members 2 and 3 by an insulating block 15. The contact 14 projects upwardly through a clearance hole 16 in the top member 3 and has upper knife-edges (Fig. 4) for electrical contact engagement with the forward tail ring B of the rocket R. The contacts are connected through a suitable firing cable 17 to a magneto-type firing key 18, comprising a small finger operated magneto, and are connected through the tail rings A and B to a squib (not shown) in the rocket for firing the rocket R. Such rockets are described in more detail in the above-mentioned patent application of Charles C. Lauritsen. The cable 17 is wound around lugs 17a on the bottom of rail 1 when the launcher is stowed.

The rear end of rail 1 is provided on its under surface with serrated semi-circular sectors 1a spaced a short distance from a threaded socket 19a adapted to receive the threaded upper end of the bolt 19 rotatably carried by a semi-circular plate 19b which serves as a keying and pivot member. The plate is slidably mounted in a semi-circular slot 20a in the central portion of a transverse supporting bar or base member 20 so as to be rotatable through an angle of approximately 60 degrees with relation to the bar. The plate 19b has a pair of upwardly-extending knife-edges 19c which cooperate with the two serrated sectors 1a on the lower surface of the rear end of rail 1 so as to lock the cross member 20 against rotation with respect to the rail when bolt 19 is tightened. The tightening of bolt 19 also forces plate 19b into slot 20a to hold the plate and cross member 20 against relative movement. The provisions for relative movement between cross member 20 and the rail 1 add flexibility to the launcher and permit use of the launcher on irregular terrain by allowing adjusting of the angular relation of cross bar 20 with respect to the launcher rail.

The bar 20 has spade members 21 at each of its ends pivotally mounted for rotation about the longitudinal axis of the bar and also for rotation from an operating position transverse of the bar as shown in Figs. 1 and 2 to a stowed position parallel to the bar as shown in Figs. 5 and 6. The spade members have long and short ground engaging members 22 which are tapered (Fig. 2) for easier entry into the ground. The shorter members 22 are tapered to approximate the cross-sectional configuration of the upper surface of the rail 1. This shape is of advantage when the bar 20 is stowed, for in this condition, the spades 21 are pivoted so that the ends of the spades carrying the shorter members 22 are pointed inwardly. The shorter members 22 then lie in the trough shaped rail when the bar 20 is mounted in the upper trough of the rail by screwing bolt 19 into aligned screw holes 23 and 24. In this position, the longer members 22 extend downwardly at the ends of the rail as shown in Figs. 5, 6 and 7.

The forward or upper end of the launcher body is provided with a lug 25 which pivotally supports an extensible pointed leg member 26 having a penetration limiting plate 27 pivotally mounted near its lower end. An opening 27a in plate 27 permits the pointed lower end of leg 25 to extend beyond the plate in a ground engaging position when the plate is pivoted to a transverse operating position. A screw 26a is provided for locking the leg in various elevational positions. The leg folds into a stowed position against the underside of the launcher rail as shown in Figs. 6 and 7, the plate 27 pivoting to lie flat against the bottom of the rail 1.

A gravity pendulum and quadrant unit 29 is hinged to the rail 1 near its forward end and folds against the bottom of the rail as shown in Fig. 7 when not in use.

In use, the launcher is transported in the stowed condition as shown in Figs. 5, 6 and 7, in which crossbar 20 is attached to the upper side of the rail 1 by means of bolt 19, the cable 17 is wound about lugs 17a, the pendulum and quadrant arrangement is folded against the bottom of the launcher rail, and the forward leg 26 is folded against the bottom of the launcher rail. The firing key 18 is stowed under one of the spade members 21 between the spade and the rail 1 as shown in Figs. 5 and 6. In this condition, the launcher fits within a 4½" circle and may be carried in the cylindrical packing case of the type used to pack the 4½" rockets used with the launcher. When so packed, the tube containing the launcher may be grouped with several rockets in their packing tubes and the whole bundle placed in a suitable container which may be conveniently dropped by parachute to ground troops.

To set up the rocket launcher for firing, the rear cross member 20 is removed from the top of the rail by unscrewing bolt 19 and is fastened to the lower rear end of the rail member by screwing bolt 19 into socket 19a in the rail. With the bolt 19 slightly loosened in the socket 19a, the knife-edges 19c are movable with respect to the serrated sections 1a on the rail and the plate 19b are movable with respect to the serrated sections 1a on the rail and the plate 19b is rotatable with respect to the cross member 20 so that the rail may be positioned in train as desired, regardless of the slope of the terrain on which it is used. The adjustable nature of the cross member 20 is shown clearly in Fig. 2.

The forward supporting member 26 is then unfolded and the penetration limiting plate 27 pivoted to operating position. The pendulum and quadrant unit 29 is swung down to operating position and the forward leg 26 is adjusted to position the launcher rail at the desired elevation as indicated by the pendulum 29. The extension member 7 is then moved outwardly to its extended position and screw 11 tightened to maintain it in this position. The cable 17 is unwound and plugged into the magneto-firing key 18, after which a rocket R is positioned on the upper surface of the rail against the ground contact member 12. The rocket is then ready for firing by operation of the firing key 18.

The foldable launcher provides the firepower of a much larger and heavier weapon of the artillery type and still is light enough and mobile enough to be carried by ground troops over almost any type of terrain or to be transported by aircraft and dropped to ground troops. The launcher is quickly and simply set up and because of its flexibility can be used on uneven terrain to great advantage. The transverse rear support adds greatly to the steadiness of the launcher and maintains it in position regardless of the terrain, thereby overcoming the tendency of other launchers to topple over when used on uneven ground. The extensible rail adds greatly to the accuracy of the weapon by providing a considerably longer rocket guide without increasing the size of the folded launcher. The construction of the rail member contributes greatly to the maintaining of the launcher at a minimum of size and weight.

The compactness of the folded launcher is greatly increased by the provision of a stowage place for each part of the launcher with a minimum number of parts being detached from their firing positions when the launcher is folded.

It is to be understood that the launcher described and shown is a preferred embodiment of the invention and that the invention is not to be limited thereto, but is intended to cover all modifications of the invention falling within the scope of the following claims.

I claim:

1. A collapsible projectile launcher comprising a main projectile guiding rail member, an extension rail member carried by said main rail member and movable between an extended firing position and a telescoped position within said main rail member, said main rail member and said extension rail member having threaded openings positioned to align when said extension rail member is in said telescoped position, a base member, and a bolt carried by said base member for removably securing said base member to the lower surface of said main rail member, said base member being stowable adjacent the upper side of said main rail member, said bolt being adapted to engage said aligned openings to retain said extension rail member in its telescoped position while at the same time retaining said base member in its stowed position.

2. A projectile launcher comprising a channeled rail for guiding the initial flight of a projectile, said rail having a serrated section at one end, a member mounted forwardly of said rail for supporting it on an incline, and a rear rail supporting structure from which the incline originates and to which the serrated section is contiguous, said structure including a supporting bar stationed generally crosswise of the rail, said bar having a rounded slot, and a coupling between the supporting bar and the rail consisting of a plate rockable in the slot and provided with a knife edge to occupy the serrated section, and a screw bolt going through the supporting bar, rockable plate and into the rail to clamp them in variously adjusted relative attitudes.

PAUL E. LLOYD.

REFERENCES CITED

The following references are of record in the file of this patent:

UNITED STATES PATENTS

| Number | Name | Date |
|---|---|---|
| 414,750 | Bohnenblust | Nov. 12, 1889 |
| 499,790 | Meadowcroft | June 20, 1893 |
| 797,613 | Schermuly | Aug. 22, 1905 |
| 801,252 | Koller | Oct. 10, 1905 |
| 1,096,076 | Troxel | May 12, 1914 |
| 1,139,823 | Thomas et al. | May 18, 1915 |
| 1,334,413 | Stokes | Mar. 23, 1920 |
| 1,838,243 | Wismer | Dec. 29, 1931 |
| 1,919,223 | Johnston | July 25, 1933 |
| 2,264,791 | Fries | Dec. 2, 1941 |